US 6,564,752 B2

(12) United States Patent
Jerome

(10) Patent No.: US 6,564,752 B2
(45) Date of Patent: May 20, 2003

(54) POULTRY COOP UNLOADER, AND METHODS

(76) Inventor: Wallace H. Jerome, 1480 E. Maple Ave., Barron, WI (US) 54812

( * ) Notice: Subject to any disclaimer, the term of this patent is extended or adjusted under 35 U.S.C. 154(b) by 0 days.

(21) Appl. No.: 09/900,225

(22) Filed: Jul. 6, 2001

(65) Prior Publication Data
US 2003/0005890 A1 Jan. 9, 2003

(51) Int. Cl.⁷ .............................................. A01K 29/00
(52) U.S. Cl. ....................................................... 119/845
(58) Field of Search ............................. 119/845, 843, 119/712

(56) References Cited

U.S. PATENT DOCUMENTS

| 3,796,189 | A | 3/1974 | Blondeel |
| 4,037,565 | A | 7/1977 | Ledwell, Jr. |
| 4,074,658 | A | 2/1978 | Mermelstein et al. |
| 4,380,969 | A | * 4/1983 | Thomas ....................... 119/843 |
| 4,600,351 | A | 7/1986 | Nelson |
| 4,768,465 | A | 9/1988 | Church |
| 5,388,948 | A | 2/1995 | Jerome |
| 5,466,116 | A | 11/1995 | Jerome |
| 5,470,194 | A | 11/1995 | Zegers |
| 5,505,582 | A | 4/1996 | Jerome |
| 5,570,657 | A | 11/1996 | Kuhlmann |
| 5,735,664 | A | 4/1998 | Jerome |
| 6,048,157 | A | * 4/2000 | Jerome ....................... 119/845 |

* cited by examiner

Primary Examiner—Charles T. Jordan
Assistant Examiner—Judith A. Nelson
(74) Attorney, Agent, or Firm—Merchant & Gould P.C.

(57) ABSTRACT

A method and apparatus for emptying a turkey coop of its cargo. A support structure, moveable along rails, is aligned with the coop. A moveable carriage, supported by the support structure, is moved into the coop and the turkeys are surrounded and contained therein. After the turkeys are contained within the moveable carriage, the moveable carriage is extracted from the coop and the turkeys move onto a conveyor belt that moves them away from the coop.

13 Claims, 5 Drawing Sheets

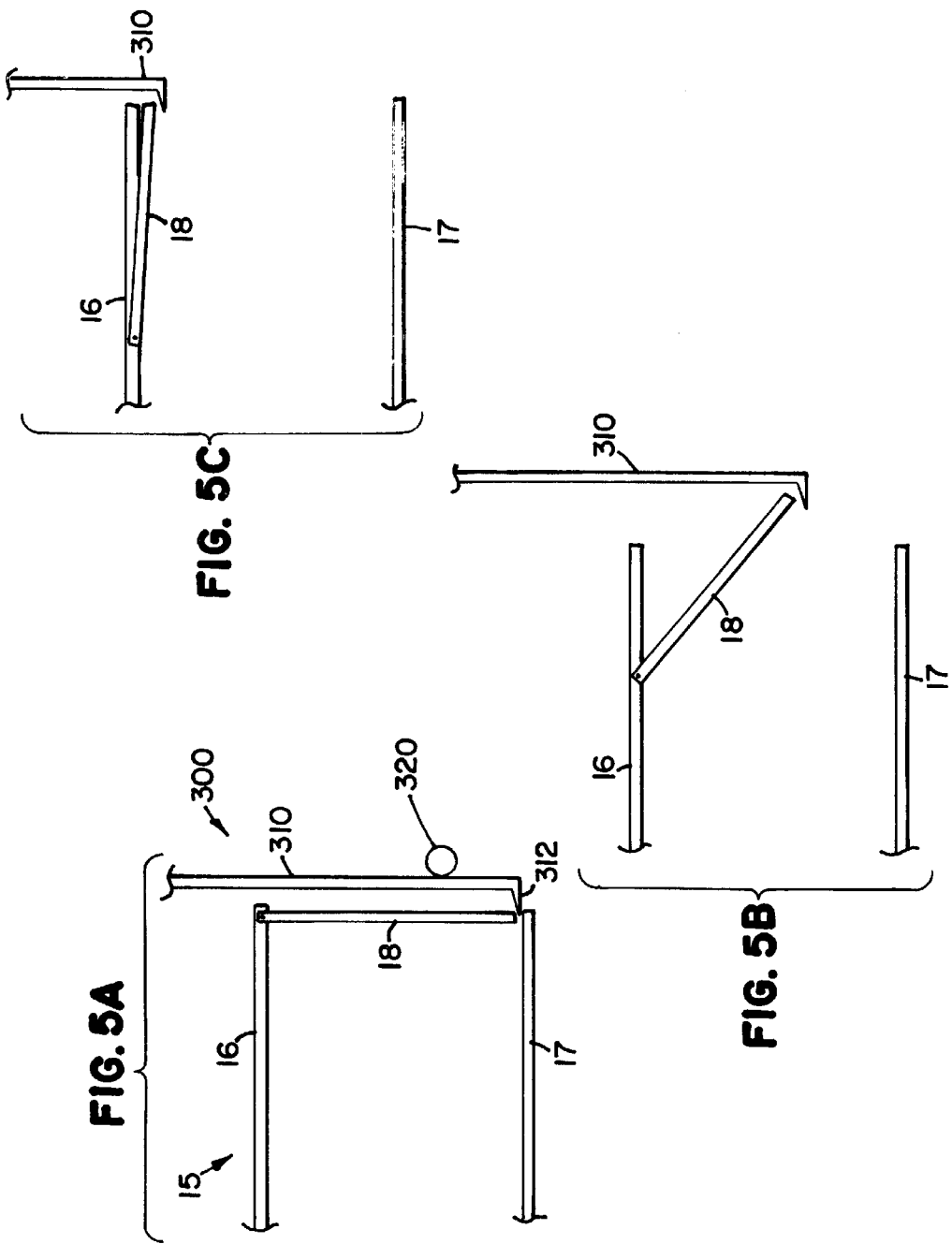

POULTRY COOP UNLOADER, AND METHODS

FIELD OF THE INVENTION

This invention relates generally to the unloading of contents of multi-layered containers, and more particularly to a method and apparatus for unloading live poultry, and particularly turkeys, from a plurality of multi-level coops on a transport vehicle.

BACKGROUND OF THE INVENTION

Poultry, and in particular turkeys, are typically transported to processing plants in multi-layered cages, coops or containers carried by a large transport vehicle such as a flatbed trailer truck. Unloading of the turkeys at, for example, a processing plant, in a systematic manner so as to avoid piling or congestion of the turkeys in the loading area and so as to avoid damage to the turkeys has long been a problem.

A transport truck typically carries as many as 120 coops for turkeys, holding approximately 1,440 turkeys; the same size transport truck typically carries as many as 160 coops for chickens, holding approximately 13,200 chickens. The poultry cages or coops are generally multi-level, usually six levels high for turkeys and up to 12 levels high for chickens.

The coops used for transporting turkeys are normally mounted on both sides of the transport truck trailer, with their coop doors or gates facing the outside of the trailer. The multi-level cages generally are stacked from 8–10 feet high, are built in sections of 8–16 feet long, and are generally about 45 inches in depth, with approximately a 6 inch ventilation air space provided between the coops down the middle of the truck. The doors of such turkey transport coops generally lift up and slide back into the coop at their tops, in overhead door manner. Such coops are generally known.

Unloading of turkeys from their carrying cages or coops of the transport vehicle and into a processing facility has long been a problem for the processing industry. Such unloading has been very labor intensive and is difficult and often dangerous to the person doing the unloading. Similarly, the unloading process is traumatic to the bird being handled, and often results in injury or damage to the bird.

Due to the large size of turkeys, their unloading has generally been performed or assisted by hand, where an unloading person typically opens one coop at a time and individually removes each turkey from its transport cage, either lifting the bird into its confining shackles for processing within the plant, or placing the bird on a conveyor belt leading into the plant for subsequent anesthetizing and handling. Since Tom turkeys generally weigh between 25 and 40 pounds, the unloading task is extremely strenuous, time consuming and difficult—and the turkeys are generally uncooperative in the process. The process can also result in undesirable damage to the turkey, which is accentuated by the fact that larger turkeys are more susceptible to injury if roughly handled.

Various automated techniques for unloading turkeys from the stacked coops have been attempted. Some methods successively lift the back ends of the turkey coops so as to pivot the coops about their lower front edges, thereby depositing the turkeys from a tilted coop onto an adjacent conveyor belt. Other methods do not require the lifting or tipping of any of the coops on the truck. Some methods enable the transport truck to be systematically emptied by progressively removing the contents of coops, one at a time by the use of an indexing carriage assembly, without the necessity of any human intervention, until the truck is completely empty.

Improvements in unloading techniques are desired.

SUMMARY OF THE INVENTION

The present invention provides an improved method and apparatus for gently, reliably and efficiently unloading poultry, and particularly turkeys, from loads of coops onto an input conveyor for a poultry processing facility. The method and apparatus eliminates the need for operators to touch or directly handle any of the turkeys during the unloading operation, thereby reducing labor costs and reducing injuries sustained by the operators. Further, the moving and urging of the turkeys during the unloading process is performed in a manner which is humane and noninjurious or traumatic to the turkeys, thereby enhancing their carcass value while still significantly reducing the costly labor intensive unloading processes typically practiced by prior art techniques.

According to one aspect of the invention, there is provided a poultry unloading apparatus for unloading poultry from a transport load of coops stacked in ordered rows and columns, wherein the coops are of the type having walls defining an internal cavity, a moveable gate for selectively opening and closing an access port into the coop internal cavity. The unloading apparatus generally comprises a support structure positioned along side and outside of the coops and a carriage moveably positioned within and supported by the support structure. The carriage is moveable into and out of a coop through the access port. Poultry within the coop is unloaded from the coop by the carriage.

The unloading apparatus has a main support structure that includes a frame, and transport rails. The support structure extends essentially parallel to the coop and the transport rails extend essentially parallel to the transport vehicle on which the coop is supported. The rails extend along the length of a plurality of coops and move the frame from one coop to another. A moveable carriage, supported by the support structure, has a containment volume for retaining poultry. The containment volume is defined by a carriage top, a first side wall and an opposite second side wall, a back wall, and the coop floor. The carriage is constructed to be supported by the support structure and to be moved into and out from the coop.

A conveyor apparatus can be provided in conjunction with the unloading apparatus. The conveyor apparatus includes an unloading conveyor extending generally along the length of a row of coops of the transport load and perpendicular to the movement of the unloading carriage in relation to its support structure. Poultry, removed from coops by the unloading apparatus, is deposited onto the unloading conveyor. A cross-over conveyor, extending generally perpendicular to the conveyor apparatus and parallel to the coop and unloading apparatus, can be provided to facilitate transfer of the poultry from the coop to the unloading conveyor.

While the invention will be described with respect to a preferred embodiment or embodiments thereof, it would be understood by those skilled in the art that the invention is not to be limited to the specifics of either the components used or the specifics of the coop structures employed. Further, while a specific technique for unloading a transport load of coops will be disclosed, the unloading process or sequence described is not to be interpreted in a limiting manner. Those skilled in the art will readily envision other techniques, configurations and embodiments of structures which embody the claimed principles of this invention.

Further, while the invention is described with respect to the handling and processing of turkeys and other poultry from transport trucks, the principles of this invention are not to be limited thereby. The apparatus and unloading processes described could well be applied to the unloading of other types of cargo.

BRIEF DESCRIPTION OF THE DRAWING

Referring to the Drawing, where like numerals represent like parts throughout the several views:

FIG. 5A is a partial side view of a coop and an apparatus for opening a coop door, the door being in a first position;

FIG. 5B is a partial side view of the coop and apparatus of FIG. 5A, the door being in a second position; and FIG. 5C is a partial side view of the coop and apparatus of FIGS. 5A and 5B, the door being in a third position.

DETAILED DESCRIPTION OF THE PREFERRED EMBODIMENT

As discussed above, while the present invention could apply to cages or coops, the invention will be described with respect to a preferred application of sequentially and systematically unloading turkeys from a plurality of multi-layered columns of transport coops. The general structure of such transport coops and their multi-layered configurations upon a transport vehicle, such as the flatbed of a transport trailer, are well-known in the art and will not be detailed herein. To the extent that a general understanding and overall description of such structures is required, the disclosures of my prior U.S. Pat. Nos. 5,388,948; 5,466,116; 5,505,582; 5,735,664; 5,743,217; and 6,109,215 are hereby incorporated by reference. Those skilled in the art will readily understand and appreciate how the coop structures of prior art configurations can be modified to accommodate the principles of the present invention, and conversely, how the principles of the present invention can be applied to existing coop structures.

Figure 1:
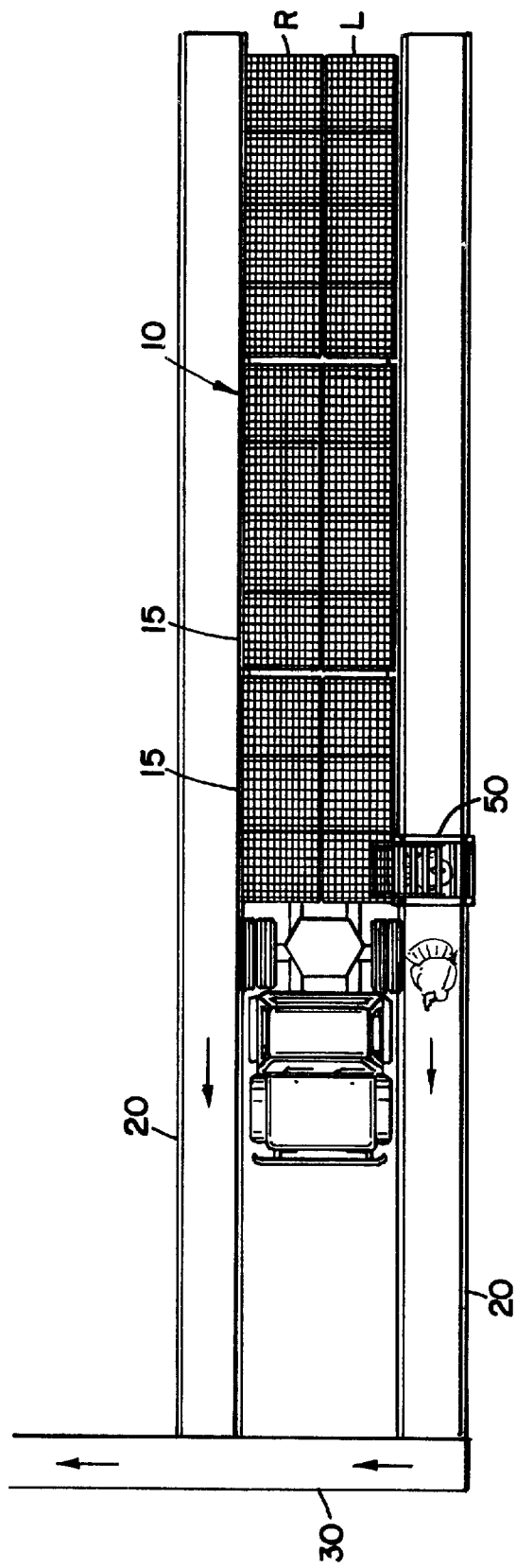
FIG. 1 is a top view of an unloading station at a turkey processing plant of the type to which this invention pertains, illustrating how a transport truck is positioned for unloading its contents, and generally illustrating the positional relationship of the unloading apparatus of this invention relative to the longitudinal sides of the transport truck.

Referring to FIG. 1, a flatbed transport truck of the type often used to transport turkeys to a processing plant is generally illustrated at 10. The trailer bed or deck of the truck carries a multi-layered plurality of turkey cages or coops 15 that are arranged in two rows (left "L" and right "R") extending in parallel fashion from the front to the rear of the trailer bed, respectively. Each of the two rows of coops is divided into a plurality of multi-layered and aligned vertical columns of coops. In a preferred embodiment, coops 15 are stacked six high, making six layers or rows of coops requiring emptying at the processing plant. The coops are generally constructed in module configuration, with each module containing from two to four vertical columns or stacks of coops connected together by appropriate framing structures. Typically, each coop is approximately four feet wide (in the longitudinal direction of the truck bed), 45 inches deep (in the width direction of the truck bed), and from 14–16 inches in height. The left "L" and right "R" rows of coops are typically separated at their "back" ends along the center of the truck by approximately six inches to allow ventilation between the two rows of stacked coops.

As is typical of coops in the industry, each coop has a solid bottom floor, a top wall, opposite first and second side walls, and a rear wall formed from a wire mesh material (having one inch by two inch mesh openings in the preferred embodiment); together, these walls define a coop interior. In some constructions, the solid bottom floor may form the top wall of the underlying coop. A front mesh gate or door is positioned opposite the rear wall and mounted for sliding pivotal motion in overhead-door manner, such that when in an "open" position, the coop door lies generally parallel to and in close proximity with the top mesh portion of the coop. When in an "open" position, access can be gained to the interior of the coop.

A more detailed description of the general operation of such coop assemblies can be found in my prior referenced patents, and will not be detailed herein. Alternately, the coops unloaded by the unloading apparatus of the present invention may be different than the coops described in my previous patents. It is understood that the unloading apparatus of the present invention will work with generally any coop assembly and structure.

Typically, the coops are supported in their stacked module orientation by a plurality of upright corner post members in a manner typical of that used in the art; two corner posts are positioned at the rear of the coop and two at the front. The corner posts are interconnected in the longitudinal direction of the transport vehicle by a plurality of crossframe members that are welded to the rear upright corner posts and to the front upright corner posts. The front and rear upright corner posts are also connected by a plurality of transversely extending (from front to rear) coop side frame members which support the floor portions of the respective coops. As with the front and rear crossframe members, the coop side frame members are welded to the respective rear and front corner posts. The rear and front upright corner posts, the rear and front crossframe members and the side frame members collectively provide a structural support framework for the stacked coop modules. The coop screening which forms the sidewall portions of the coops is secured to the above-described support framework members.

FIG. 1 generally illustrates the positioning of a transport truck during an unloading operation, relative to the unloading apparatus 50 of this invention. For a more detailed description of the general nature of a processing plant into which turkeys unloaded from the transport truck pass, the reader is referred to my prior referenced patents. In general, transport truck 10 is accurately positioned in lateral alignment relative to the turkey unloading apparatus 50 to be hereinafter described. A longitudinal conveyor 20 carries the unloaded turkeys from the unloading apparatus 50 to a main conveyor 30, which is generally perpendicular to the longitudinal conveyor 20, and which then carries the turkeys into the plant. Either of these conveyors 20, 30 can be inclined or elevated as needed to facilitate moving of the birds. The unloading conveyors 20, 30 may be of any convenient width, but are preferably from 36 to 45 inches in width. The conveyors 20, 30 can have associated therewith appropriate side walls or guides (not illustrated) for maintaining turkeys on the conveyor transport surfaces during movement.

Figure 2:
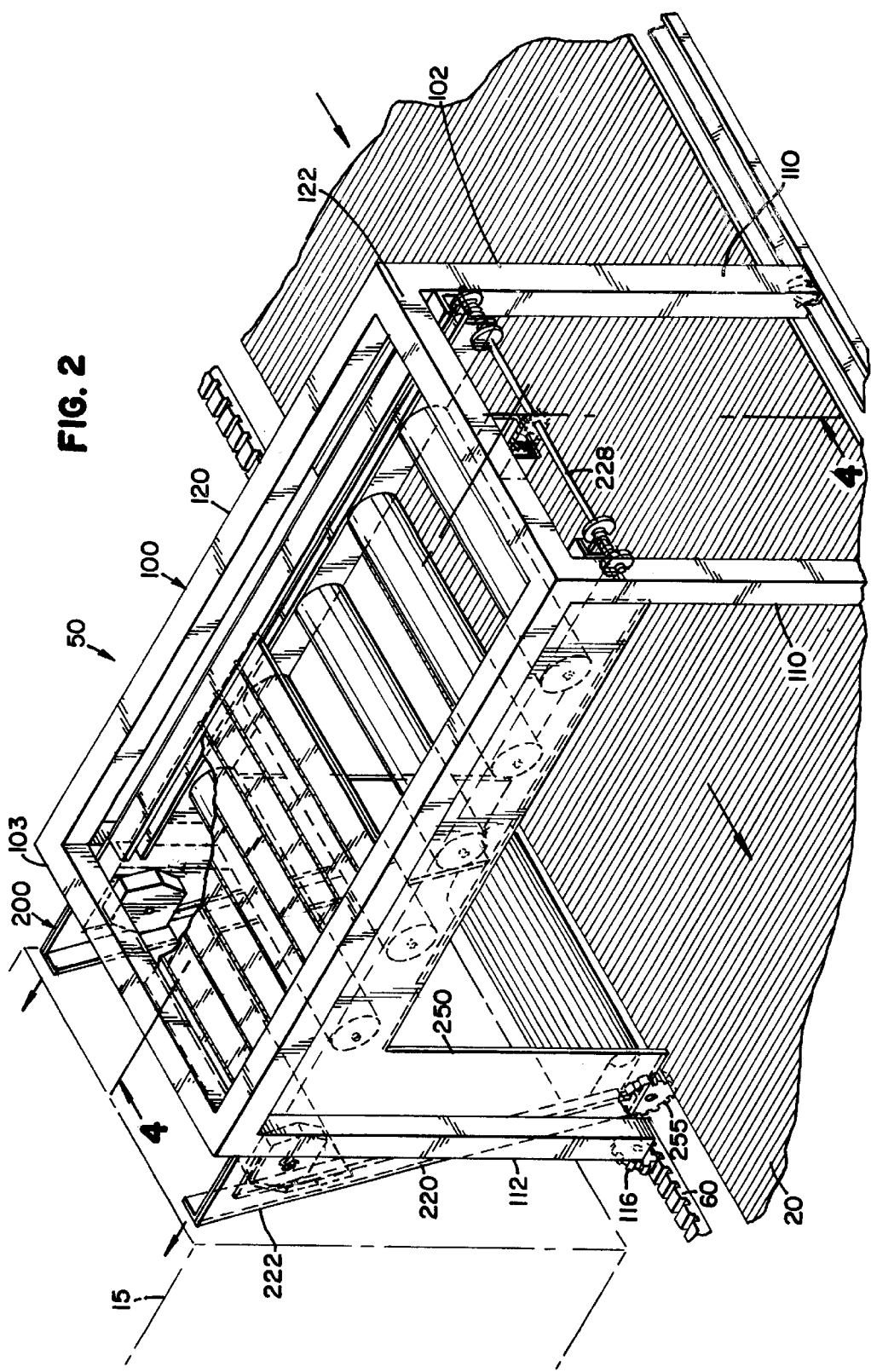
FIG. 2 is a perspective view, with portions thereof broken away, of the unloading apparatus of this invention, showing both the support structure and the moveable carriage in a withdrawn orientation.
Figure 3:
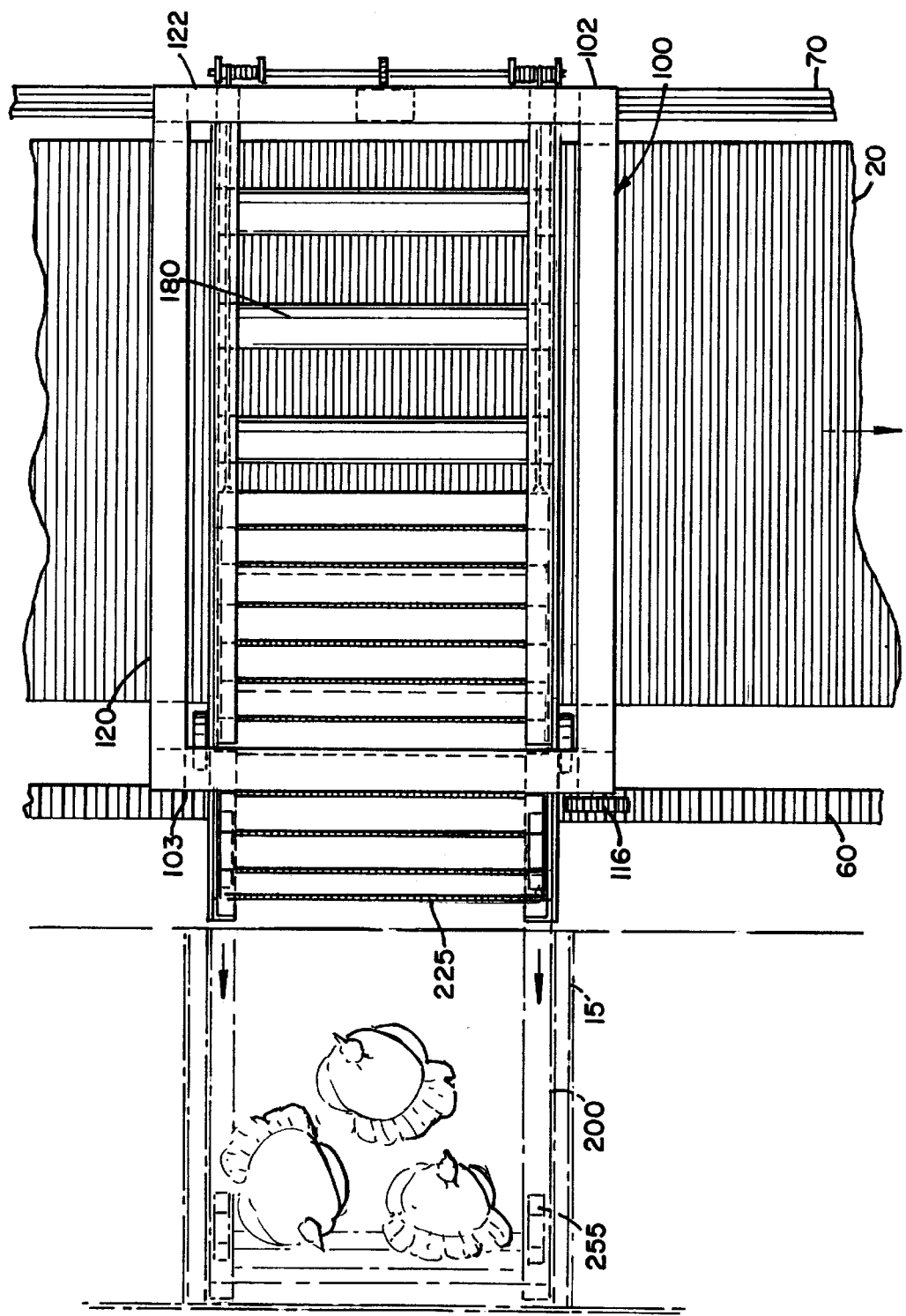
FIG. 3 is a top view of the unloading apparatus of this invention, with the moveable carriage shown in the withdrawn orientation, and with the moveable carriage shown, in phantom, in an extended orientation into a coop.
Figure 4:
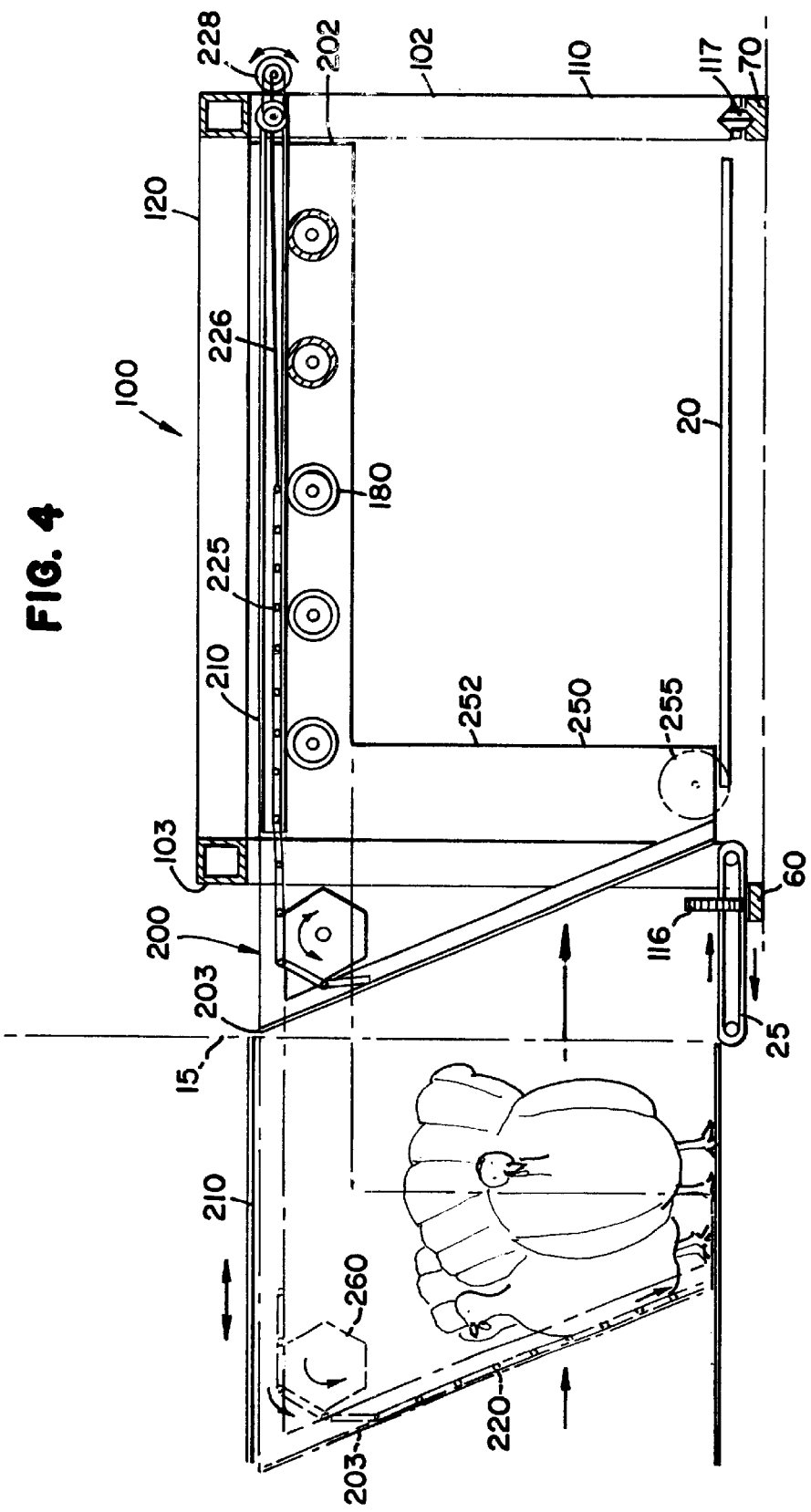
FIG. 4 is a diagrammatic side view of the unloading apparatus taken along line 4—4 of FIG. 1, with the moveable carriage shown in the withdrawn orientation and, in phantom, in the extended orientation.

Referring now to FIGS. 2 through 4, unloading apparatus 50 of the present invention includes main support structure 100 and a moveable carriage 200 that is moveable into and out from coop 15 on transport truck 10. Moveable carriage 200 is constructed to fit at least partially, and preferably close to its entirety, inside or within support structure 100. Preferably, moveable carriage 200 is sized to extract all poultry that might be present in coop 15; that is, carriage 200 should not allow poultry to fit between carriage 200 and the interior walls of coop 15. As shown in FIG. 1, unloading apparatus 50 is aligned with coop 15, so that turkeys from coop 15 are unloaded by unloading apparatus 50 and are carried away by conveyors 20, 30.

Main support structure 100 is a frame-like structure having a first end 102 and an opposite second end 103. Two major cross-members 120 extend from first end 102 to second end 103 and terminate at first vertical members 110 at first end 102 and at second vertical members 112 at second end 103. Major cross-members 120 extend generally transverse or perpendicular to truck 10. Two minor cross-beam members 122 connect to major cross-members 120 to form a rectangular frame. Minor cross-beam members 122 extend generally parallel to truck 10. A vertical member 110, 112 is positioned at each intersection of cross-members 120 and 122. Cross-members 120, 122 and vertical members 110, 112 are preferably metal bars, such as stainless steel or cast iron. A preferred material for these various members 110, 112, 120, 122 is cast angle irons, generally having dimensions about 2 inches by 2 inches.

Support structure 100 resides on and moves in relation to rails 60, 70, best seen in FIGS. 3 and 4. Rails 60, 70 generally extend parallel to truck 10. First vertical members 110, at the end opposite their attachment to cross-beam members 120, 122, terminate at V-rail 70; second vertical members 112, at the end opposite their attachment to cross-beam members 120, 122, terminate at toothed, serrated, or notched rail 60. V-rail 70 and toothed rail 60 are positioned outside the edges of conveyor belt 20, as best seen in FIG. 3, so that conveyor 20 passes under main support structure 100 without hindrance.

First vertical members 110 have a roller 117 mounted thereon that contacts V-rail 70 and allows for movement of main support structure 100 along the length of V-rail 70. V-rail 70 has a concave surface that allows roller 117 to easily ride therein. Second vertical members 112 have a toothed gear wheel 116 that contacts and engages toothed rail 60. Toothed rail 60 has notches therein that allow main support structure 100 to be incrementally moved along toothed rail 60. An example of a toothed rail 60 and a toothed gear wheel 116 is a conventional rack and pinion system. The movement of gear wheel 116 along toothed rail 60 can be mechanically activated, such as by a manual crank, or the movement can be hydraulically, electrically, or pneumatically controlled. An electric motor is preferred in most embodiments. In some embodiments, it may be desired that roller 117 and V-rail 70 are also a gear wheel and notched rail.

Support structure 100 is configured and arranged to support and retain therein at least a portion of moveable carriage 200. Because moveable carriage 200 is constructed to fit within coop 15, moveable carriage 200 has dimensions slightly smaller than coop 15; in turn, support structure 100 has dimensions slightly larger than moveable carriage 200. In most embodiments, support structure 100 is sized to approximate the size, i.e., length, width and height, of coop 15. Since a typical turkey coop 15 is four feet wide (in the longitudinal direction of the truck bed), the minor cross-beam members 122 have a length of about four feet, and vertical members 110, 112 are spaced at essentially four foot intervals. Further, since a typical turkey coop 15 is about 45 inches deep (in the transverse direction of the truck bed), the major cross-beam members 120 have a length of about 45 inches. The height of a typical turkey coop 15 is about 15 inches high, thus the length of vertical members 110, 112 is similar.

Mounted to and extending across major cross-beam members 120 are rollers 180. These rollers 180 are provided on main support structure 100 to provide physical support for the top rails 210 of carriage 200, as will be described in detail below. In some embodiments, a continuous or partially continuous ceiling of carriage 200 may be supported by rollers 180. Rollers 180 are generally idler rollers, without any drive mechanism associated therewith; however, in some embodiments, driven rollers may be desired, as will be described below.

As stated earlier, unloading apparatus 50 of the present invention includes a main support structure 100 and a moveable carriage 200 that is supported by the support structure 100 and that is moveable into and out from coops 15 that are to be unloaded of their cargo.

Moveable carriage 200 is constructed to move from a withdrawn configuration within main support structure 100, to an extended configuration within the internal volume or cavity of coop 15. Moveable carriage 200 has a first end 202 and an opposite second end 203. When in the withdrawn configuration, first end 202 of carriage 200 is positioned in close proximity to first end 102 of main support structure 100; similarly, second end 203 of carriage 200 is positioned in close proximity to second end 103 of support structure 100. In some embodiments, a portion of carriage 200 can extend past first end 102 when carriage 200 is within support structure 100. When in an extended configuration, first end 202 is positioned in close proximity to second end 103 of support structure 100, and second end 203 of carriage 200 is positioned within coop 15, preferably at the back wall. Again, a portion of carriage 200 may extend past second end 103. For example, a structure such as support arms can remain within support structure 100 to stabilize carriage 200 when in the extended configuration; these support arms may then extend past first end 102 when in the retracted configuration. In each of FIGS. 3 and 4, carriage 200 is shown withdrawn into the support structure 100, and in phantom, carriage 200 is shown extended into coop 15.

Moveable carriage 200 is a frame-like structure with top rail members 210 that extend from first end 202 to second end 203. Positioned at second end 203 is a sloped back structure 220 that extends from top rail members 210. Together, first end 202, second end 203, top rail members 210 and sloped back structure 220 define an internal volume of carriage 200 that will accept turkeys from the coop 15 being unloaded. Sloped back structure 220 includes a retractable louvered back wall 225 extending between back rails 222 which extend from and connect to top rail members 210. Sloped back structure 220 has two configurations: in a first, receiving configuration, louvered back wall 225 is retracted from between back rails 222 so that sloped back structure 220 is not continuous; rather, sloped back structure 220 provides an access port therethrough; in a second, extracting configuration, louvered back wall 225 is positioned between back rails 222 so that sloped back structure 220 is a continuous structure across the width of carriage 200 with no access port therethrough.

The two configurations of sloped back structure 220 allow for proper unloading of turkeys or other cargo using carriage 200. When moveable carriage 200 is moved into coop 15, as will be described in greater detail below, sloped back structure 220 is retracted so that the turkeys in coop 15 pass through the open access port as carriage 200 is moved into coop 15. When carriage 200 is being extracted from coop 15, louvered back wall 225 is extended across sloped back structure 220, providing a solid back wall for urging the turkeys out from coop 15.

Back wall 225 can be any moveable wall that can be retracted and returned to position. In FIG. 4, back wall 225 is depicted as a plurality of hinged sections. In other embodiments, back wall 225 can be an otherwise segmented structure, or a flexible sheet. A guide wheel 260 is provided to guide and facilitate moving back wall 225 from its retracted position to its extracting position. In FIGS. 2 and 4, guide wheel 260 is depicted as a hexagonal wheel sized to incrementally engage the hinged sections of back wall 225. A cable 226 connected to back wall 225 and to winch system 228 allows back wall 225 to be moved from its retracted position to its extended position.

To facilitate urging of the turkeys out from coop 15 and positioning on conveyor belt 20, a partial side wall 250 depends and extends from top rail members 210 toward conveyor belt 20. Side wall 250 has an outlet access 252 sized to allow turkeys, or other cargo being unloaded by apparatus 50, to pass therethrough. Side wall 250 can be formed from a continuous sheet of material such as sheet metal or a material such as Plexi-glass, a sheet of wire mesh, or can be formed from individual rods or strips joined together. Side wall 250 may also strengthen and stabilize the structure of carriage 200. This partial side wall 250 could be positioned on only one side of carriage 200; the opposite side of carriage 200 can have a continuous side wall that extends from first end 202 to second end 203. Such an embodiment will be preferred when conveyor belt 20 will always carry the turkeys in one direction away from carriage 200, such as shown in FIG. 1.

Mounted to partial side wall 250 is a support wheel 255, which helps support moveable carriage 200 on the coop floor, in particular when carriage 200 is extended out from support structure 100. Support wheel 255 also facilitates moving carriage 200 in and out of coop 15.

A cross-over conveyor belt 25 can be included to facilitate transport of the turkeys from coop 15 onto the unloading conveyor belt 20. Additional information regarding cross-over conveyor belts can be found in my previous patents. Conveyor belt 20 the quickly moves the unloaded turkeys away from coop 15 and unloading apparatus 50.

Method of Unloading Cargo

Unloading apparatus 50 of the present invention, described above, is used for unloading of turkeys, poultry, and other cargo from coops 15 having a front access port. Unloading apparatus 50 includes a support structure 100 that is moveable longitudinally along the length of the transport vehicle on which coops 15 are positioned.

Unloading apparatus 50 is supported on rails 60, 70, which extend parallel to transport vehicle 10; see FIG. 3. Unloading apparatus 50 is moveable along the length of rails 60, 70, so that apparatus 50 can be properly aligned with the coop to be unloaded. Either or both of rails 60, 70 can include a drive mechanism to help properly position unloading apparatus 50 with respect to coop 15; in a preferred embodiment disclosed above, a toothed wheel 116 and complimentary toothed rail 60 are used to move apparatus 50. Conveyor belt 20 runs parallel to, and preferably between, rails 60, 70.

To remove a load of turkeys from the internal volume or cavity of coop 15, unloading apparatus 50 is aligned with coop 15, such as shown in FIGS. 1 and 3. Unloading apparatus 50 is positioned generally perpendicular to the length of transport vehicle 10 in FIG. 1, so that unloading apparatus 50 extends generally perpendicular to transport vehicle 10.

It is necessary to open the gate or door of coop 15 prior to unloading any cargo. This may be done manually or in any automated or semi-automated manner. One embodiment of a coop gate opener is shown in FIGS. 5A, 5B and 5C. In particular, coop gate opener 300 is used to open gate 18 of coop 15, which is shown having top wall or ceiling 16 and bottom wall or floor 17. Gate 18 is hingedly attached to and movable in relation to top wall 16. Coop gate opener 300 includes a lifting arm 310 having a toe 312, which is constructed to be urged or forced between bottom wall 17 and gate 18. Gate opener 300 includes a offset push bar 320 to wedge toe 312 beneath gate 18. Push bar 320 may be hydraulic or electrically powered. In FIG. 5A, toe 312 is poised to be wedged between gate 18 and bottom wall 17. Push bar 320 will be activated and pushed against lifting arm 310 to position toe 312 under gate 18. Lifting arm 310 may be pivotally secured to allow for easy lateral movement of arm 310. Once under gate 18, lifting arm 310 is lifted or otherwise moved vertically. This may be done by a cable or pulley system or any other system that can lift arm 310. The motion of lifting arm 310 causes gate 18 to open; gate 18 is shown partially open in FIG. 5B. Lifting arm 310 continues until gate 18 is sufficiently open. In the open position, as shown in FIG. 5C, coop 15 is ready to accept movable carriage 200 therein.

Coop gate opener 300 may be a system separate from unloading apparatus 50, or may be attached thereto. In most embodiments, it will be desired to have the opener 300 integral with unloading apparatus 50.

Once unloading apparatus 50 is aligned, moveable carriage 200 is extracted out and away from support structure 100, which remains positioned on rails 60, 70, and carriage 200 is moved into coop 15. The top of carriage 200 is supported on rollers 180 of support structure 100 as carriage 200 moves. Carriage 200 is further supported by support wheel 255, which provides contact with the floor of coop 15. Carriage 200 is sized and shaped to fit within coop 15, preferably without contacting the top or side walls of the coop. In one embodiment, moveable carriage 200 is moved into coop 15 by a motorized screw device, such as an Acme screw. In another embodiment, the movement of carriage 200 is controlled by cables or pulleys that are electrically or manually controlled.

As moveable carriage 200 is moved into coop 15, back wall 225 is retracted up over guide wheel 260 so that sloped back structure 220 has an access port therein so that carriage 200 can move over the turkeys within the coop. Carriage 200 is moved into the coop, preferably until all turkeys are positioned within the carriage structure. Once the carriage 200 is positioned over the desired turkeys, backwall 225 is lowered to its extracting position; in the extracting position, backwall 225 closes any access port in sloped back structure 220. Carriage 200 is retracted out from coop 15, back towards support structure 100. When in the extracting position, a good portion of the weight of carriage 200 is placed on support wheel 255; as carriage 200 retracts back into support structure 100, support structure 100, in particular rollers 180, accept and support much of the weight of carriage 200.

As carriage 200 is extracted from coop 15 and retracted into support structure 100, the turkeys are forced to move, typically walk, along the coop floor out the gate or access port of the coop. Preferably, at the coop gate, a cross-over conveyor 25 (FIG. 4) is provided to move the turkeys from coop 15 onto unloading conveyor belt 20. Conveyor belt 20 moves the turkeys perpendicularly away from coop 15 and unloading apparatus 100; thus preferably, the turkeys are positioned so that they easily pass through outlet access 252 in side wall 250 without making contact with side wall 250.

To unload a next coop, unloading apparatus 50 is moved along rails 60, 70 and aligned with the next coop. Back wall 225 is retracted to provide an access port in sloped back structure 220, and moveable carriage 200 is moved into the coop, repeating the process described above. After the coops along the length of truck 10 have been unloaded, the entire system, including apparatus 50, rails 60, 70, and conveyor belts 20, 30, is either elevated or lowered to the next row of coops 15.

It will be understood that turkeys unloaded as described above from their respective coops are carried by the conveyor belts 20, 30, which carry them into the processing plant. It will be appreciated that the apparatus and method described for unloading turkeys from transport coops provides a safe, rapid and semi-automated process for performing the unloading operation in a simple, cost effective and reliable manner and which minimizes injury and damage to the birds being unloaded.

While the invention has been described with respect to a preferred embodiment thereof, and with respect to specific types of components used therein, it will be understood by those skilled in the art that the invention is not to be limited in any manner by the specifics of either the disclosed embodiment or the components described. Such embodiments and components have been described to illustrate clear examples of how the principles of the invention can be specifically applied. All alternatives and modifications of the foregoing are intended to be covered within the broad scope of the appended claims.

I claim:

1. An unloading apparatus for unloading poultry from a coop having a floor, the poultry positioned on the coop floor, the unloading apparatus comprising:
    (a) a support structure comprising a frame;
    (b) a moveable carriage comprising:
        (i) a containment volume for retaining poultry, the containment volume defined by a carriage top, a first side wall and an opposite second side wall, a back wall, and the coop floor; and
        (ii) the carriage constructed and arranged to be supported by the support structure and moved into and out from the support structure, and to be moved into and out from the coop.

2. The unloading apparatus of claim 1 further comprising a first rail and a second rail, the support structure being moveably positioned on the first and second rails.

3. The unloading apparatus of claim 2, wherein the first rail is a toothed rail and the support structure comprises a toothed wheel for engaging the toothed rail.

4. The unloading apparatus of claim 1, wherein the first side wall is a partial side wall.

5. The unloading apparatus of claim 1, wherein the back wall comprises a moveable section that is retractable to provide an access port through the back wall.

6. The unloading apparatus of claim 5, wherein the moveable back wall section comprises a plurality of hinged sections.

7. The unloading apparatus of claim 5, the moveable carriage comprising a guide for facilitating movement of the moveable back wall section.

8. The unloading apparatus of claim 1, wherein the frame of the support structure comprises rollers to support the moveable carriage.

9. The unloading apparatus of claim 1, further comprising a mechanical screw device to move the moveable carriage into and out from the coop.

10. The unloading apparatus of claim 1, further comprising a conveyor belt extending from the coop to the support structure, the conveyor belt configured to move poultry from the coop floor to a second conveyor belt.

11. A method of unloading poultry from a coop having an internal cavity, the poultry present within the internal cavity, the method comprising the steps of:
    (a) aligning an unloading apparatus with the internal cavity of the coop, the unloading apparatus comprising a support structure and a moveable carriage configured and adapted to move within the internal cavity of the coop, the carriage having a containment volume, a portion of which is defined by a back wall having a moveable section;
    (b) retracting the moveable back wall section to provide an access port in the back wall;
    (c) moving the carriage into the internal cavity of the coop so that the poultry passes through the access port in the back wall and is within the containment volume of the carriage;
    (d) closing the access port in the back wall; and
    (e) extracting the carriage from the coop.

12. The method of claim 11, wherein the step of closing the access port in the back wall comprises:
    (a) returning the moveable back wall section to an unretracted position.

13. The method of claim 11, wherein the step of extracting the carriage from the coop comprises:
    (a) urging the poultry to move through the internal cavity of the coop.

* * * * *